US006738183B2

United States Patent
Shigehara

(10) Patent No.: US 6,738,183 B2
(45) Date of Patent: May 18, 2004

(54) OPTICAL FILTER FUNCTIONING AS BOTH A GAIN EQUALIZER AND NOISE-LIGHT BLOCKING FILTER

(75) Inventor: Masakazu Shigehara, Yokohama (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 40 days.

(21) Appl. No.: 09/995,858

(22) Filed: Nov. 29, 2001

(65) Prior Publication Data

US 2002/0126371 A1 Sep. 12, 2002

(30) Foreign Application Priority Data

Nov. 30, 2000 (JP) ...................... P2000-365867

(51) Int. Cl.[7] .............. H01S 3/00; G02B 5/22
(52) U.S. Cl. .................. 359/337.2; 359/885
(58) Field of Search .................. 359/337.1, 337.2, 359/359, 722, 723, 885

(56) References Cited

U.S. PATENT DOCUMENTS

| | | | | |
|---|---|---|---|---|
| 5,742,427 A | | 4/1998 | Kakui et al. ............. | 359/341 |
| 5,764,829 A | * | 6/1998 | Judkins et al. ........... | 385/37 |
| 5,838,867 A | | 11/1998 | Onishi et al. ............ | 385/123 |
| 6,011,652 A | * | 1/2000 | Cushing ................. | 359/588 |
| 6,055,094 A | | 4/2000 | Shima et al. ............ | 359/341 |
| 6,219,176 B1 | * | 4/2001 | Terahara ................ | 359/341.1 |
| 6,253,008 B1 | * | 6/2001 | Harumoto et al. ........ | 385/37 |
| 6,301,042 B1 | * | 10/2001 | Pelekhaty .............. | 359/359 |
| 6,307,691 B1 | * | 10/2001 | Goossen ................ | 359/885 |
| 6,337,753 B1 | * | 1/2002 | Goossen ................ | 398/79 |
| 6,337,937 B1 | * | 1/2002 | Takushima et al. ....... | 385/28 |
| 6,362,916 B2 | * | 3/2002 | Wu et al. ............... | 359/337.1 |
| 6,377,390 B1 | * | 4/2002 | Mizuno et al. .......... | 359/337.1 |
| 6,407,863 B1 | * | 6/2002 | Archambault et al. .... | 359/589 |
| 6,411,417 B1 | * | 6/2002 | Roberts et al. .......... | 398/177 |
| 6,483,631 B1 | * | 11/2002 | Cheng et al. ........... | 359/337.11 |
| 6,545,798 B2 | * | 4/2003 | Bartolini et al. ........ | 359/337.1 |
| 6,563,984 B1 | * | 5/2003 | Harumoto et al. ........ | 385/37 |
| 6,611,371 B2 | * | 8/2003 | Wigley et al. .......... | 359/337.2 |

FOREIGN PATENT DOCUMENTS

| | | | | |
|---|---|---|---|---|
| JP | 07049418 A | * | 2/1995 | ......... G02B/05/28 |
| JP | 2001318354 A | * | 11/2001 | ......... G02F/01/09 |
| WO | WO 94/00784 | | 1/1994 | ......... G02B/6/16 |

OTHER PUBLICATIONS

Ghafouri–Shiraz et al. Analysis of a quarter wave Phase–Shifted Double Phase–Shift–Controlled Distributed Feedback Wavelength Tunable Optical Filter. IEEE Journal of Quantum Electronics. vol. 33, No. 4, Apr. 1997, pp. 556–561.*

"How E-TEK Specifies its WDM Compounds: Bandpass Wavelength Division Multiplexer (BWDM) 4–Channel Filter", E–TEK Dynamics, (1999).

* cited by examiner

Primary Examiner—Thomas G. Black
Assistant Examiner—Deandra M. Hughes
(74) Attorney, Agent, or Firm—McDermott, Will & Emery

(57) ABSTRACT

The present invention relates to an optical filter and the like, applicable to a gain equalizer for equalizing the gain of an optical amplifier as well, comprising a structure enabling a repeater and the like to have a small-sized, inexpensive configuration. This optical filter 22 has such a transmission spectrum that a ripple of 1 dB or more exists with respect to light in a communication wavelength band. This transmission spectrum is designed so as to yield a transmissivity of −10 dB or less in both of a first blocking wavelength band having a bandwidth of 20 nm or more located on the shorter wavelength side than the communication wavelength band, and a second blocking wavelength band having a bandwidth of 20 nm or more located on the longer wavelength side than the communication wavelength band. The optical filter having such a transmission spectrum can function as a filter for blocking noise light and as a gain equalizer.

8 Claims, 6 Drawing Sheets

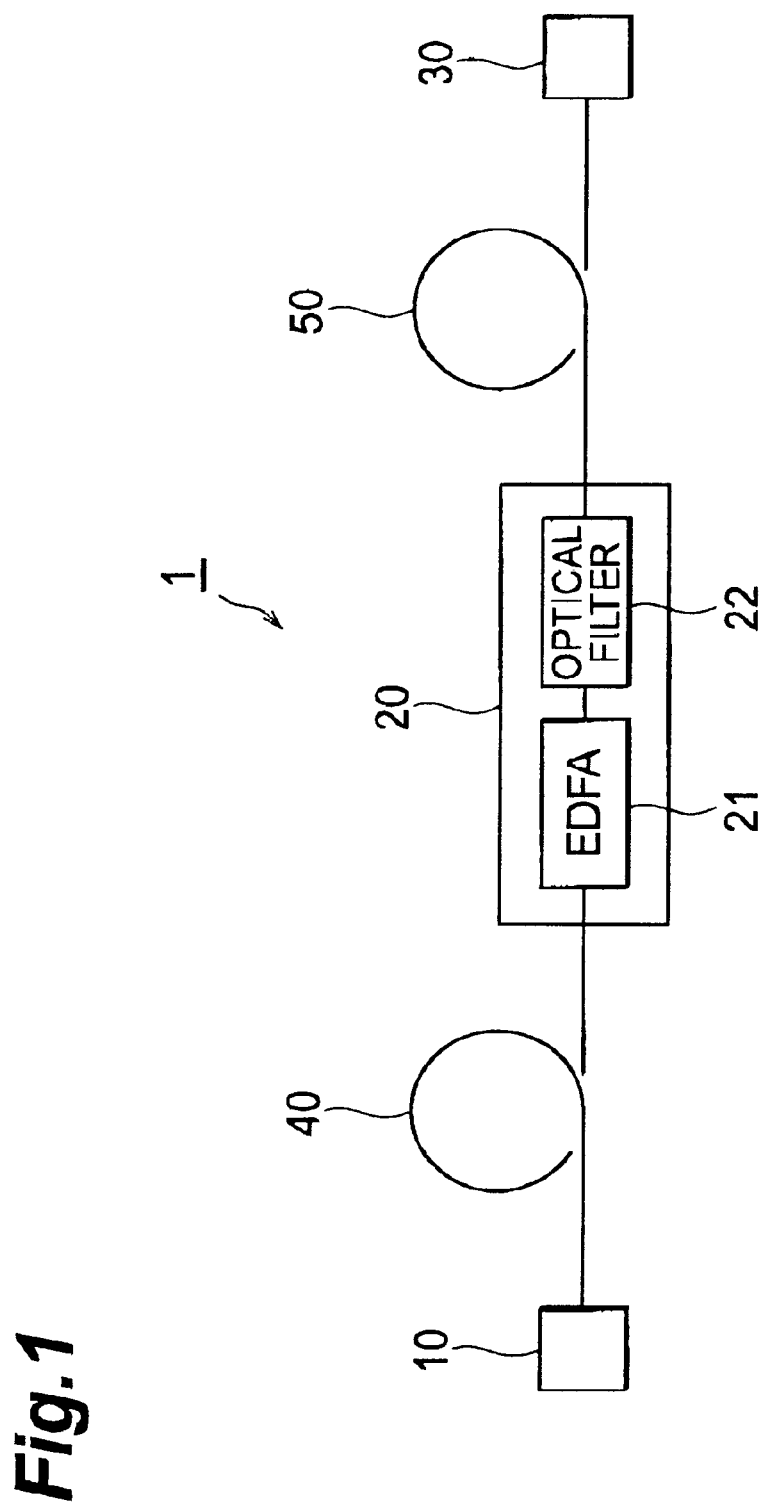

OPTICAL FILTER FUNCTIONING AS BOTH A GAIN EQUALIZER AND NOISE-LIGHT BLOCKING FILTER

BACKGROUND OF THE INVENTION

1. Field of the Invention

The present invention relates to an optical filter applicable to a gain equalizer for equalizing the gain of an optical fiber amplifier as well, an optical amplifier system including the same, and an optical communication system including the optical amplifier system.

2. Related Background Art

In optical communication systems, an Er-doped optical fiber amplifier (EDFA: Erbium-Doped Fiber Amplifier) has been utilized as an optical amplifier for amplifying respective signal powers of a plurality of channels included in a communication wavelength band. The EDFA uses an optical fiber having a light-guiding region doped with Er (EDF: Erbium-Doped Fiber) as an amplifying medium, and supplies pumping light (at a wavelength of 1.48 µm or 0.98 µm) to the EDF, thereby amplifying the power of each signal (in a wavelength band of 1.55 µm or 1.58 µm) propagating through the EDF.

In a typical optical communication system, the gain spectrum of the EDFA is not flat in the communication wavelength band including the individual signal channels, so that a gain equalizer is utilized together with the EDFA. This gain equalizer has a loss spectrum with a form substantially identical to that of the gain spectrum of the EDFA. Thus, the optical communication system is designed such that the total spectrum formed by the gain spectrum of the EDFA and the loss spectrum of the gain equalizer becomes flat in the communication wavelength band.

The EDFA outputs not only the power-amplified signal but also noise light such as amplified spontaneous emission (ASE) and pumping light. If noise light is transmitted, the possibility of reception errors occurring at the time of receiving signals at a receiving end will increase. Therefore, a noise light blocking filter for blocking these noise light components is also provided.

SUMMARY OF THE INVENTION

The inventors studied the conventional techniques mentioned above and, as a result, have found the following problem. Namely, since the gain equalizer and noise light blocking filter are provided together with the optical amplifier in the conventional optical communication system, repeaters and the like including them are large in size and expensive.

In order to overcome the above-mentioned problem, it is an object of the present invention to provide an optical filter which functions not only as a gain equalizer for equalizing the gain of an optical amplifier but also as a noise light blocking filter, and has a structure for enabling repeaters and the like to reduce their size and cost together with the optical amplifier; an optical amplifier system including the same; and an optical communication system including the optical amplifier system.

For achieving the above-mentioned object, the optical filter according to the present invention has respective transmission characteristics different from each other in a communication wavelength band, a first blocking wavelength band having a bandwidth of 20 nm or more located on a shorter wavelength side than the communication wavelength band, and a second blocking wavelength band having a bandwidth of 20 nm or more located on a longer wavelength side than the communication wavelength band. Namely, the transmission spectrum of the optical filter has a ripple of 1 dB or more with respect to light in the communication wavelength band directed from an input end to an output end, and a transmissivity of −10 dB or less with respect to light in the first blocking wavelength band and light in the second blocking wavelength band which are directed from the input end to the output end.

The optical amplifier system according to the present invention comprises an optical amplifier, and an optical filter having the transmission spectrum mentioned above (the optical filter according to the present invention). The optical amplifier amplifies respective signal powers of a plurality of channels included in the communication wavelength band. The optical filter equalizes the gain of the optical amplifier in the communication wavelength band. The optical communication system according to the present invention is an optical communication system for transmitting respective signals of a plurality of channels included in a communication wavelength band, and includes an optical amplifier system having the structure mentioned above (the optical amplifier system according to the present invention). The optical amplifier system amplifies respective signal powers of a plurality of channels included in the communication wavelength band.

The first and second blocking wavelength bands do not overlap the communication wavelength band, whereas each of the gaps between the wavelength bands (the difference between the maximum wavelength of the first blocking wavelength band and the minimum wavelength of the communication wavelength band, and the difference between the minimum wavelength band of the second blocking wavelength band and the maximum wavelength of the communication wavelength band) is set to 10 nm or less, preferably 5 nm or less, more preferably 2 nm or less. Though it will be sufficient for each of the first and second blocking wavelength bands to have a bandwidth of 20 nm or more in order to block ASE, the bandwidth is preferably 40 nm or more in order to block the light included in L band as well, 60 nm or more in order to block the pumping light (having a wavelength of 1480 nm) as well, and 80 nm or more in order to block multiplexed pumping light (having a wavelength ranging from 1450 nm to 1480 nm) as well.

In the optical communication system employing the optical filter according to the present invention, fluctuations among signal channels are reduced (the gain is equalized) by the optical filter in signals once amplified by the optical amplifier. In particular, the optical filter according to the present invention exhibits a transmissivity of −10 dB or less with respect to light in the first and second blocking wavelength bands not overlapping the communication wavelength band, whereas each of the first and second blocking wavelength bands has a bandwidth of 20 nm or more, whereby at least the ASE generated in the optical amplifier is blocked by the optical filter. Namely, the optical filter according to the present invention functions not only as a gain equalizer but also as a noise light blocking filter. Therefore, as an optical amplifier system including the optical filter, a system having a small size with a low cost can be realized. The optical filter may be arranged either downstream or upstream of the optical amplifier. In the case of an optical communication system in which a plurality of stages of optical amplifiers are arranged, it will be sufficient if the optical filter is arranged between the plurality of stages of optical amplifiers.

Specifically, a first embodiment of the optical filter according to the present invention comprises an optical circulator having first to third ports, and a waveguide type grating device. In the circulator, light from the input end is captured from the first port and is outputted from the second port. Light captured from the second port is outputted from the third port. The optical waveguide type grating device is optically connected to the second port of the optical circulator, and reflects a light component in the communication wavelength band while transmitting therethrough light components in the first and second blocking wavelength bands in the light having arrived from the second port. In thus configured optical filter according to the first embodiment, the light from the input end is outputted from the second port of the optical circulator by way of the first port and reaches the optical waveguide type grating device. In the light having reached the optical waveguide type grating device, most of the light components in the first and second blocking wavelength bands are transmitted through the optical waveguide type grating device On the other hand, most of the light component in the communication wavelength band is reflected by the optical waveguide type grating device, and is outputted from the third port of the optical circulator by way of the second port. Therefore, the transmission spectrum of the optical filter with respect to the light directed from the input end to the output end has a form substantially the same as that of the reflection spectrum of the optical waveguide type grating device A second embodiment of the optical filter according to the present invention comprises an optical waveguide type grating device arranged on an optical path between input and output ends. In the light having arrived from the input end, the optical waveguide type grating device in the second embodiment transmits therethrough the light component in the communication wavelength band while reflecting the light components in the first and second blocking wavelength bands. Preferably, an optical isolator is provided between the input end and the optical waveguide type grating device. The optical isolator transmits therethrough the forward light directed from the input end to the optical waveguide type grating device, while blocking the backward light directed from the optical waveguide type grating device to the input end. In thus configured optical filter according to the second embodiment, light from the input end is transmitted through the optical isolator, so as to reach the optical waveguide type grating device. In the light having reached the optical waveguide type grating device, most of the light components in the first and second blocking wavelength bands are reflected by the optical waveguide type grating device The light reflected by the optical waveguide type grating device is blocked by the optical isolator, so that it does not return to the upstream side. On the other hand, most of the light component in the communication wavelength band is transmitted through the optical waveguide type grating device, so as to reach the output end. Therefore, the transmission spectrum of the optical filter with respect to the light directed from the input end to the output end has a form substantially the same as that of the transmission spectrum of the optical waveguide type grating device.

A third embodiment of the optical filter according to the present invention comprises a dielectric multilayer film filter which reflects or absorbs light components in the first and second blocking wavelength bands while transmitting therethrough the light component in the communication wavelength band in light having arrived from the input end. Preferably, the dielectric multilayer film filter is arranged in a state inclined with respect to the optical axis (coinciding with the traveling direction of the light having arrived) In thus configured optical filter according to the third embodiment, light from the input end reaches the dielectric multilayer film filter. In the light having reached the dielectric multilayer film filter, most of the light components in the first and second blocking wavelength bands are reflected by the dielectric multilayer film filter Thus reflected light does not return to the upstream side, since the dielectric multilayer film filter is inclined with respect to the optical axis. On the other hand, most of the light component in the communication wavelength band is transmitted through the dielectric multilayer film filter, so as to be outputted from the output end. Therefore, the transmission spectrum of the optical filter with respect to the light directed from the input end to the output end has a form substantially the same as that of the transmission spectrum of the dielectric multilayer film filter.

BRIEF DESCRIPTION OF THE DRAWINGS

FIG. 1 is a diagram showing the configuration of an optical communication system including the optical filter according to the present invention;

FIG. 2A is a chart showing the transmission spectrum of the optical filter shown in FIG. 1, whereas FIG. 2B is a chart showing the gain spectrum of the EDFA shown in FIG. 1;

FIG. 5A is a chart for explaining a specific manufacturing process of an optical waveguide type grating device, whereas

DETAILED DESCRIPTION OF THE PREFERRED EMBODIMENTS

Figures 2A, 2B:
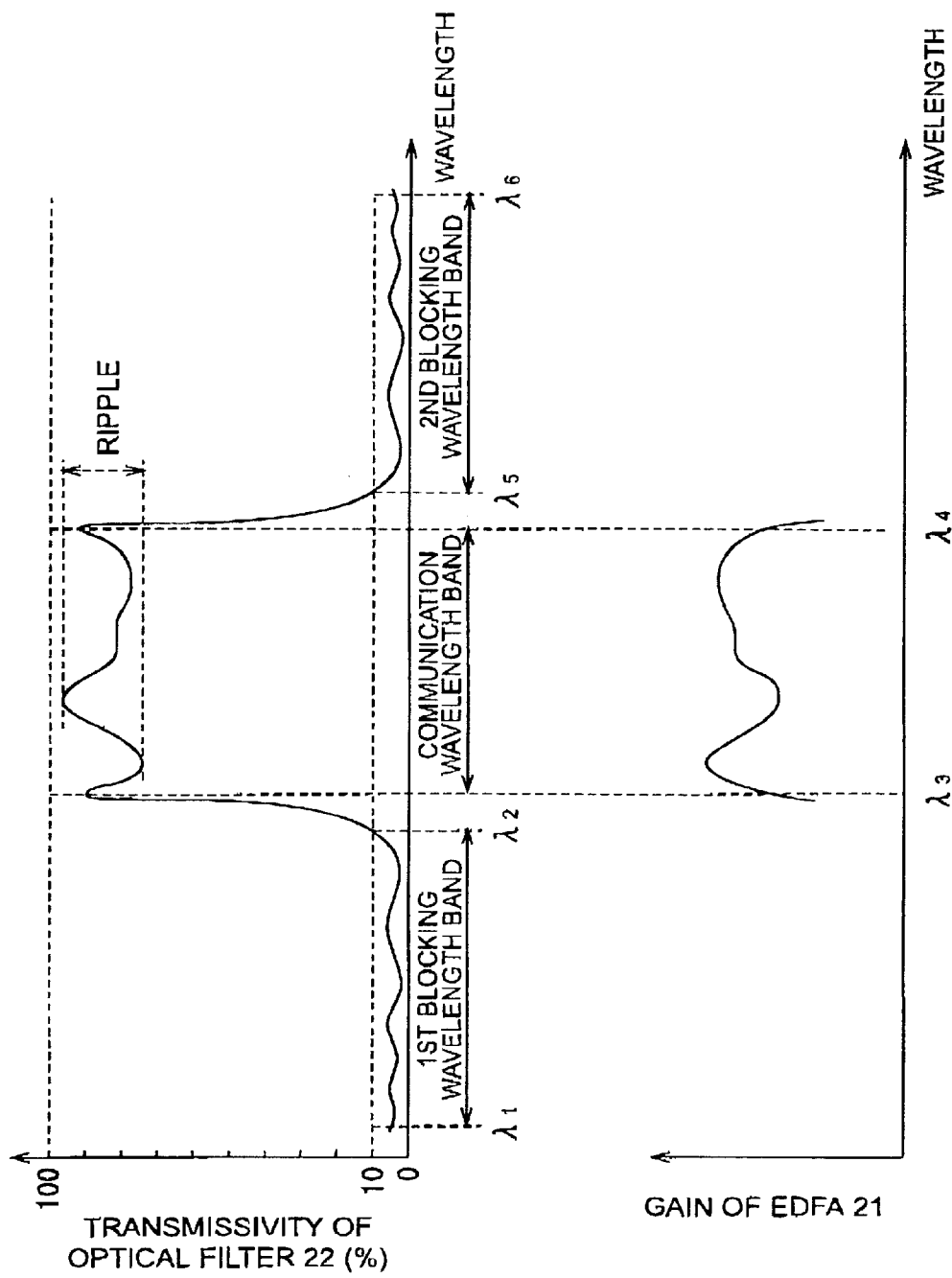

In the following, embodiments of the optical filter and the like according to the present invention will be explained in detail with reference to FIGS. 1, 2A, 2B, 3, 4, 5A, 5B, 6, and 7 In the explanation of the drawings, constituents identical to each other will be referred to with numerals identical to each other without repeating their overlapping descriptions.

FIG. 1 is a diagram showing the configuration of an optical communication system 1 including an optical filter 22 according to the present invention This optical communication system 1 comprises a transmitter 10, a repeater 20, and a receiver 30. The transmitter 10 and the repeater 20 are connected to each other by an optical fiber transmission line 40, whereas the repeater 20 and the receiver 30 are connected to each other by an optical fiber transmission line 50. The repeater 20 comprises an optical amplifier system including an Er-doped optical fiber amplifier (EDFA) 21 and an optical filter 22 disposed downstream thereof. In the optical communication system 1, signals of a plurality of channels included in a communication wavelength band sent out from the transmitter 10 propagate through the optical fiber transmission line 40, thereby reaching the repeater 20. In the repeater 20, respective signal powers of the signal channels are amplified by the EDFA 21, and their gain is equalized by the optical filter 22. The signals outputted from the repeater 20 propagate through the optical fiber transmission line 50, thereby reaching the receiver 30.

As the Er-doped optical fiber amplifier (EDFA) 21, optical fiber amplifiers disclosed in U.S. Pat. Nos. 5,838,867 (FIG. 2), 5,742,427, and 6,055,094, for example, can be employed. Each of these optical fiber amplifiers comprises an optical amplification optical fiber in which at least a light-guiding region is doped with Er, and a pumping light source for supplying pumping light having a predetermined wavelength Such an optical amplifier 21 and the optical filter 22 constitute an optical amplifier system FIG. 2A shows the transmission spectrum of the optical filter 22 according to the present invention, whereas FIG. 2B shows the gain spectrum of the EDFA 21. In these charts, wavelengths $\lambda_1$ to $\lambda_6$ satisfy the relationship of $\lambda_1<\lambda_2<\lambda_3<\lambda_4<\lambda_5<\lambda_6$, whereas the wavelength range of $\lambda_3$ to $\lambda_4$ indicates the communication wavelength band in particular. Namely, as shown in FIG. 2B, the EDFA 21 has a gain in the communication wavelength band of $\lambda_3$ to $\lambda_4$. For example, the wavelengths of $\lambda_3$ and $\lambda_4$ are 1520 nm and 1560 nm, respectively, whereby the EDFA 21 amplifies respective signal powers of a plurality of channels included in C band as the communication wavelength band As shown in FIG. 2A, the transmission spectrum of the optical filter 22 according to the present invention has such a form that a ripple (difference between the maximum and minimum values) of 1 dB or more exists with respect to light in the communication wavelength band of $\lambda_3$ to $\lambda_4$. With respect to light in the communication wavelength band of $\lambda_3$ to $\lambda_4$, the transmission spectrum of the optical filter 22 is designed so as to equalize the gain of the EDFA 21. Also, the transmission spectrum of the optical filter 22 has a transmissivity of –10 dB or less with respect to light in a first blocking wavelength band of $\lambda_1$ to $\lambda_2$ located on the shorter wavelength side than the communication wavelength band of $\lambda_3$ to $\lambda_4$, whereas the first blocking wavelength band of $\lambda_1$ to $\lambda_2$ has a bandwidth $(\lambda_2-\lambda_1)$ of 20 nm or more Further, the transmission spectrum of the optical filter 22 has a transmissivity of –10 dB or less with respect to light in a second blocking wavelength band of $\lambda_5$ to $\lambda_6$ located on the longer wavelength side than the communication wavelength band of $\lambda_3$ to $\lambda_4$ as well, where as the second blocking wavelength band of $\lambda_5$ to $\lambda_6$ also has a bandwidth $(\lambda_6-\lambda_5)$ of 20 nm or more.

Each of the gap $(\lambda_3-\lambda_2)$ between the minimum wavelength of the communication wavelength band and the maximum wavelength of the first blocking wavelength band, and the gap $(\lambda_5-\lambda_4)$ between the maximum wavelength of the communication wavelength band and the minimum wavelength of the second blocking wavelength band is preferably as narrow as possible, and is 10 nm or less, preferably 5 nm or less, more preferably 2 nm or less.

Since the optical filter 22 has the transmission spectrum mentioned above, it equalizes the gain of the EDFA 21 with respect to light in the communication wavelength band of $\lambda_3$ to $\lambda_4$, while blocking ASE with respect to light in the first blocking wavelength band of $\lambda_1$ to $\lambda_2$ and light in the second blocking wavelength band of $\lambda_5$ to $\lambda_6$. Namely, the optical filter 22 functions not only as a gain equalizer but also as a noise light blocking filter. Therefore, the repeater 20 including the optical filter 22 can be constructed in a small size at a low cost.

The optical filter 22 fully functions as an optical filter for blocking ASE when its transmissivity with respect to light in the first blocking wavelength band of $\lambda_1$ to $\lambda_2$ and light in the second blocking wavelength band of $\lambda_5$ to $\lambda_6$ is –10 dB or less. Though it is sufficient for each of the first blocking wavelength band of $\lambda_1$ to $\lambda_2$ and the second blocking wavelength band of $\lambda_5$ to $\lambda_6$ exhibiting a transmissivity of –10 dB or less to have a bandwidth of 20 nm or more in order to block ASE alone, the bandwidth is preferably 40 nm or more in order to block the light included in L band as well. Each bandwidth is preferably 60 nm or more in order to block the pumping light (having a wavelength of 1480 nm) as well For further blocking multiplexed pumping light (having a wavelength ranging from 1450 nm to 1480 nm), each bandwidth is preferably 80 nm or more.

Figure 3:
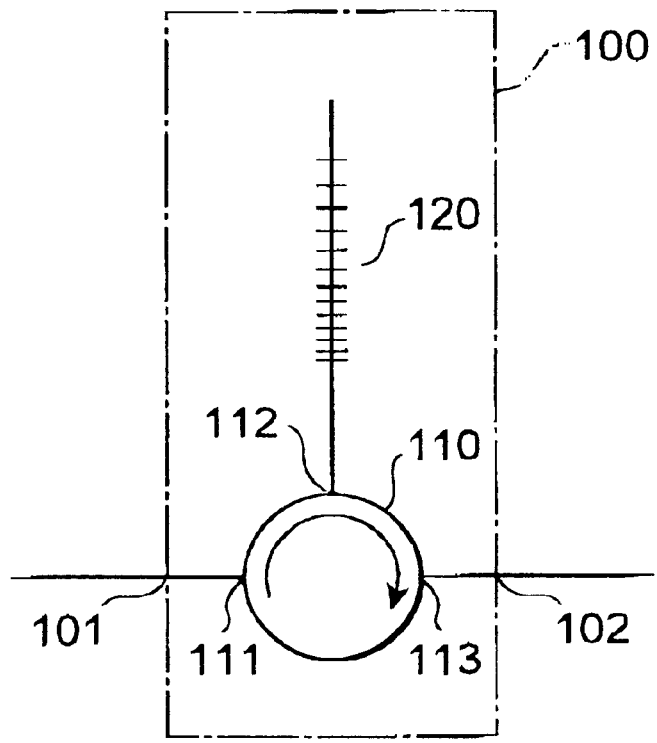
FIG. 3 is a view showing the configuration of a first embodiment of the optical filter according to the present invention.
Figure 4:
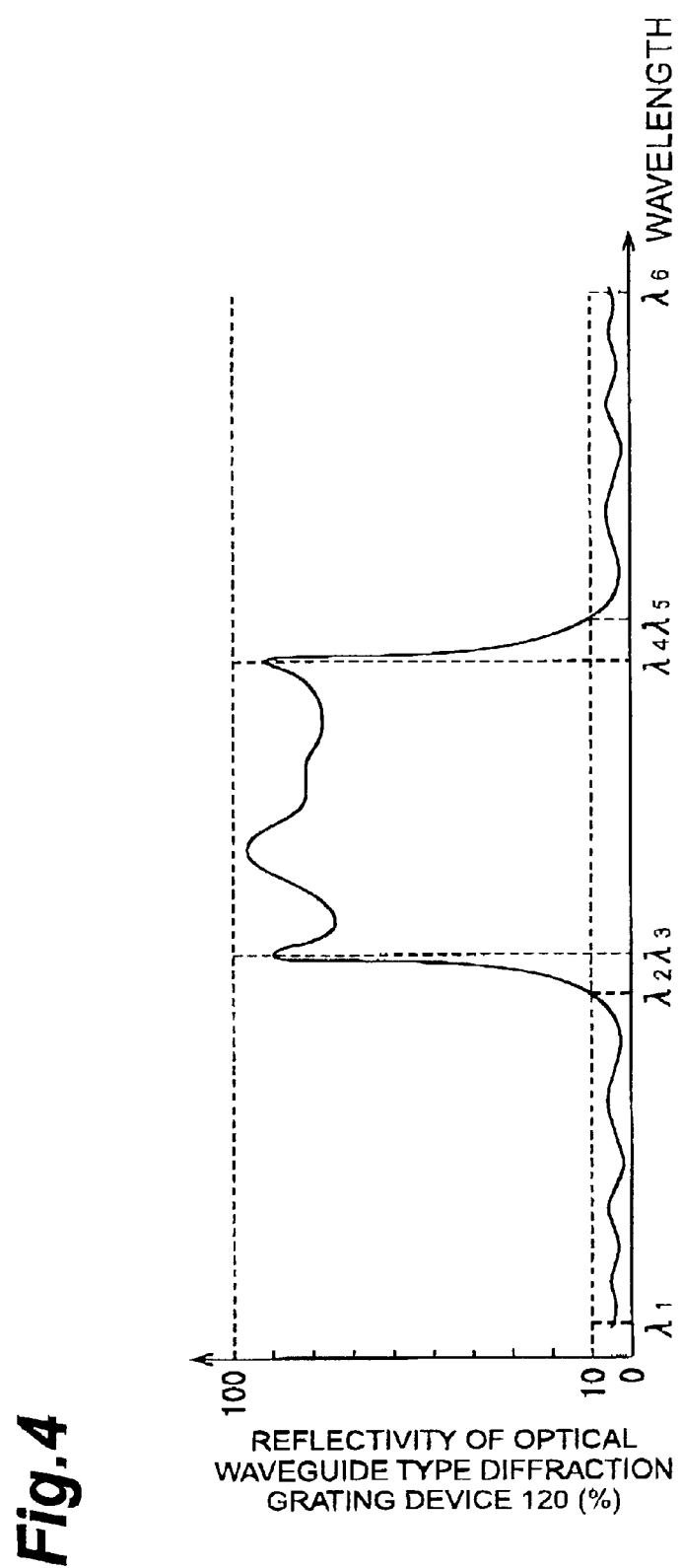
FIG. 4 is a chart showing the reflection spectrum of the optical waveguide type grating device included in the optical filter according to the first embodiment (FIG. 3)

A first embodiment of the optical filter 22 according to the present invention will now be explained. FIG. 3 is a diagram showing the configuration of an optical filter 100 according to the first embodiment The optical filter 100 according to the first embodiment comprises an optical circulator 110 and an optical waveguide type grating device 120 which are disposed between an input end 101 and an output end 102 as shown in FIG. 3, and has a transmission spectrum with a form substantially the same as that of the transmission spectrum shown in FIG. 2A.

The optical circulator 110 has a first port 111, a second port 112, and a third port 113. The first port 111 is optically connected to the input end 101 of the optical filter 100, whereas the third port 113 is optically connected to the output end 102 of the optical filter 100. The optical circulator 110 outputs to the second port 112 the light captured by way of the first port 111, and outputs to the third port 113 the light captured by way of the second port 112.

The optical waveguide type grating device 120 is optically connected to the second port 112 of the optical circulator 110. The optical waveguide type grating device 120 has a reflection spectrum such as the one shown in FIG. 4, thereby reflecting the light component in the communication wavelength band $\lambda_3$ to $\lambda_4$ while transmitting therethrough the light components in the first blocking wavelength band $\lambda_3$ to $\lambda_2$ and second blocking wavelength band $\lambda_5$ to $\lambda_6$ in the light having arrived from the second port 112 of the optical circulator 110. The reflection spectrum of the optical waveguide type grating device 120 has a form substantially the same as that of the transmission spectrum shown in FIG. 2A (the transmission spectrum of the optical filter 100 corresponding to the optical filter 22 according to the present invention).

The optical waveguide type grating device 120 is an optical device in which the refractive index of a core region of an optical waveguide (e g., an optical fiber) is spatially modulated in the longitudinal direction, whereas the interval and amplitude of the refractive index modulation vary in the longitudinal direction. At each position of the refractive index modulation area in the longitudinal direction, the optical waveguide type grating device 120 reflects, at a predetermined reflectivity corresponding to the amplitude of refractive index modulation, light having a wavelength satisfying the Bragg condition corresponding to the interval of refractive index modulation. Namely, the longitudinal distribution of each of the interval and amplitude of refractive index modulation is appropriately set in the optical waveguide type grating device 120 so as to yield the reflection spectrum shown in FIG. 4

Figure 5A:
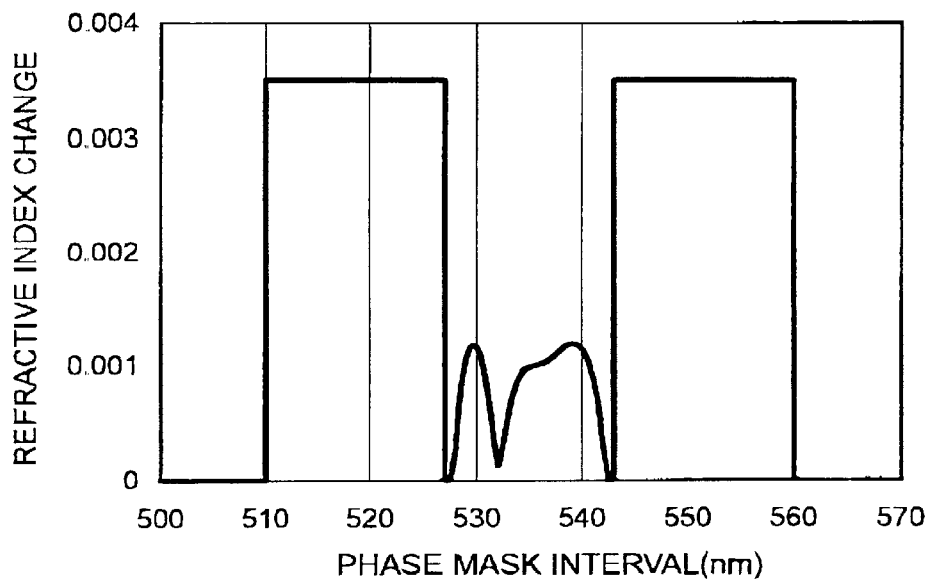
Figure 5B:
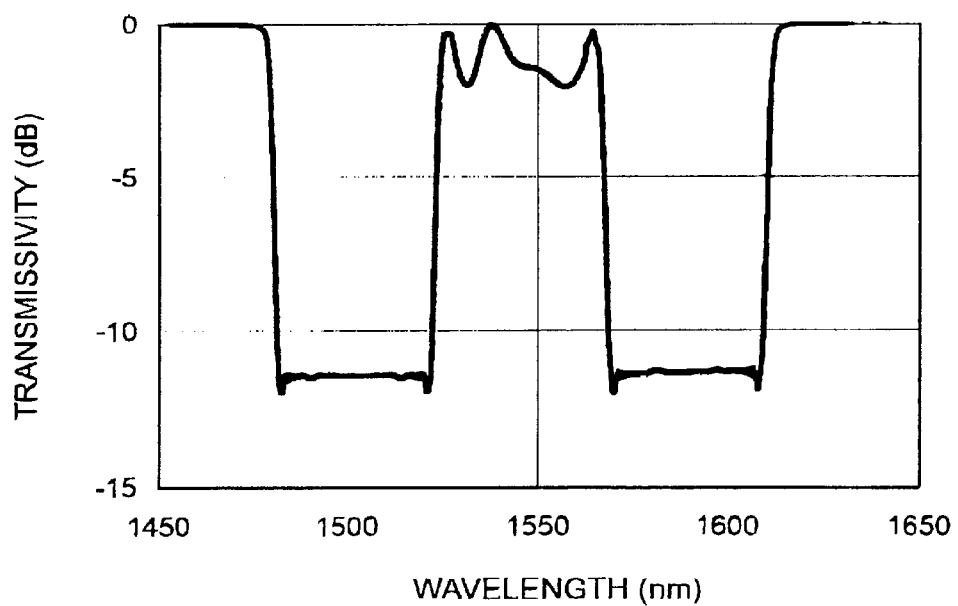
FIG. 5B is a chart showing the transmission spectrum of the optical waveguide type grating device in which a refractive index change occurred as shown in FIG. 5A.

Such an optical waveguide type grating device is obtained, for example, when an optical fiber having a light-guiding region doped with Ge is irradiated with ultraviolet interference light emitted from a light source by way of a Mach-Zehnder interference optical system and a phase mask as shown in International Patent Application WO 94/00784 and U.S. Pat. No. 6,253,008. Namely, the optical waveguide type grating device is obtained when a periodical refractive index change is generated within the light-guiding region upon ultraviolet irradiation. Specifically, the optical fiber having a light-guiding region doped with Ge is irradiated with ultraviolet rays by way of a phase mask, so as to generate a change in refractive index such as the one shown in FIG. 5A (the ordinate in FIG. 5A indicating the change in refractive index) in the longitudinal direction of the optical fiber As a consequence, an optical waveguide type grating device having a transmission spectrum such as the one shown in FIG. 5B is obtained.

In the optical filter 100 according to the first embodiment, light from the input end 101 is outputted from the second port 112 by way of the first port 111 of the optical circulator 110, so as to reach the optical waveguide type grating device 120 In the light having reached the optical waveguide type grating device 120, most of the light components in the first blocking wavelength band $\lambda_1$ to $\lambda_2$ and second blocking wavelength band $\lambda_5$ to $\lambda_6$ are transmitted through the optical waveguide type grating device 120. On the other hand, most of the light component in the communication wavelength band $\lambda_3$ to $\lambda_4$ is reflected by the optical waveguide type grating device 120, so as to return to the second port 112 of the optical circulator 110. Thus reflected light is outputted from the third port 113 by way of the second port 112, so as to reach the output end 102. Therefore, although the transmission spectrum of the optical filter 100 with respect to the light directed from the input end 101 to the output end 102 is affected by the loss in the optical circulator 110 and the like, its form is substantially the same as that of the reflection spectrum of the optical waveguide type grating device 120.

Figure 6:
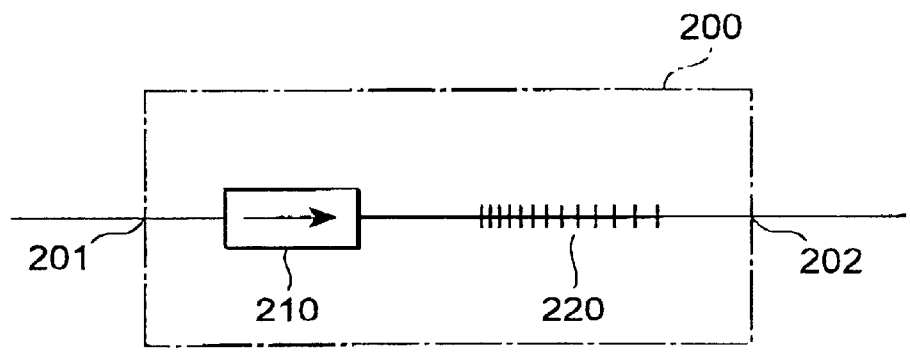
FIG. 6 is a diagram showing the configuration of a second embodiment of the optical filter according to the present invention.

A second embodiment of the optical filter 22 according to the present invention will now be explained. FIG. 6 is a diagram showing the configuration of an optical filter 200 according to the second embodiment. The optical filter 200 according to the second embodiment comprises an optical isolator 210 and an optical waveguide type grating device 220 which are disposed between an input end 201 and an output end 202 as shown in FIG. 6, and has a transmission spectrum with a form substantially the same as that of the transmission spectrum shown in FIG. 2A.

The optical isolator 210 is disposed between the input end 201 of the optical filter 200 and the optical waveguide type grating device 220, and transmits therethrough the forward light directed from the input end 201 to the optical waveguide type grating device 220 while blocking the backward light directed from the optical waveguide type grating device 220 to the input end 201 In the light having arrived from the optical isolator 210, the optical waveguide type grating device 220 transmits therethrough the light component in the communication wavelength band $\lambda_3$ to $\lambda_4$ while reflecting the light components in the first blocking wavelength band $\lambda_1$ to $\lambda_2$ and second blocking wavelength band $\lambda_5$ to $\lambda_6$. The transmission spectrum of the optical waveguide type grating device 220 has a form substantially the same as that of the transmission spectrum shown in FIG. 2A (the transmission spectrum of the optical filter 200 corresponding to the optical filter 22 according to the present invention).

The optical waveguide type grating device 220 is an optical device in which the refractive index of a core region of an optical waveguide (e.g., an optical fiber) is spatially modulated in the longitudinal direction, whereas the interval and amplitude of the refractive index modulation vary in the longitudinal direction. At each position of the refractive index modulation area in the longitudinal direction, the optical waveguide type grating device 220 reflects, at a predetermined reflectivity corresponding to the amplitude of refractive index modulation, light having a wavelength satisfying the Bragg condition corresponding to the interval of refractive index modulation. Namely, the longitudinal distribution of each of the interval and amplitude of refractive index modulation is appropriately set in the optical waveguide type grating device 220 so as to yield the characteristic reflection spectrum mentioned above In particular, the interval and amplitude of refractive index modulation in the optical waveguide type grating device 220 are appropriately set so as to reflect the light components in the first blocking wavelength band $\lambda_1$ to $\lambda_2$ and second blocking wavelength band $\lambda_5$ to $\lambda_6$, which differ from the communication wavelength band. The optical waveguide type grating device 220 in the second embodiment can be made in a manner similar to that in the case of the first embodiment.

In the optical filter 200 according to the second embodiment, light from the input end 201 is transmitted through the optical isolator 210, so as to reach the optical waveguide type grating device 220. In the light having reached the optical waveguide type grating device 220, most of the light components in the first blocking wavelength band $\lambda_1$ to $\lambda_2$ and second blocking wavelength band $\lambda_5$ to $\lambda_6$ are reflected by the optical waveguide type grating device 220. Thus reflected light is blocked by the optical isolator 210, so that it does not return to the upstream side. On the other hand, most of the light component in the communication wavelength band $\lambda_3$ to $\lambda_4$ is transmitted through the optical waveguide type grating device 220, so as to be outputted from the output end 202. Therefore, although the transmission spectrum of the optical filter 200 with respect to the light directed from the input end 201 to the output end 202 is affected by the loss in the optical isolator 210 and the like, its form is substantially the same as that of the transmission spectrum of the optical waveguide type grating device 220.

Figure 7:
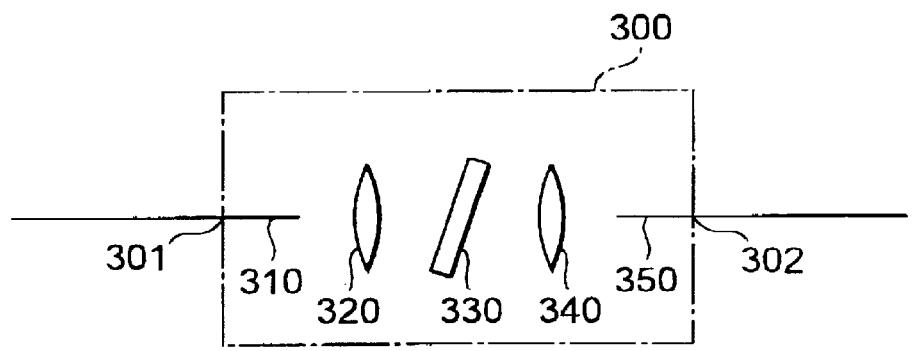
FIG. 7 is a diagram showing the configuration of a third embodiment of the optical filter according to the present invention.

A third embodiment of the optical filter 22 according to the present invention will now be explained. FIG. 7 is a diagram showing the configuration of an optical filter 300 according to the third embodiment. The optical filter 300 according to the third embodiment comprises an optical waveguide (optical fiber) 310, a lens 320, a dielectric multilayer film filter 330, a lens 340, and an optical waveguide (optical fiber) 350 which are disposed between an input end 301 and an output end 302 as shown in FIG. 7, and has a transmission spectrum with a form substantially the same as that of the transmission spectrum shown in FIG. 2A.

The optical waveguide 310 guides light from the input end 301 of the optical filter 300 to the lens 320. The lens 320 collimates the light outputted from an end face of the optical waveguide 310, and outputs thus collimated light to the dielectric multilayer film filter 330. The dielectric multilayer film filter 330 is arranged in a state inclined with respect to the optical axis, and transmits therethrough the light component in the communication wavelength band $\lambda_3$ to $\lambda_4$ while reflecting the light components in the first blocking wavelength band $\lambda_1$ to $\lambda_2$ and second blocking wavelength bands to $\lambda_5\lambda_6$ in the collimated light having arrived from the lens 320. The transmission spectrum of the dielectric multilayer film filter 330 has a form substantially the same as that of the transmission spectrum shown in FIG. 2A (the transmission spectrum of the optical filter 300 corresponding to the optical filter 22 according to the present invention) The lens 340 collects the light outputted from the dielectric multilayer film filter 330 and guides thus collected light to an end face of the optical waveguide 350. The optical waveguide 350 guides the light having reached its end face to the output end 302 of the optical filter 300.

The dielectric multilayer film filter 330 has such a structure that a plurality of dielectric layers having respective refractive indices and film thicknesses appropriately set are stacked. The refractive index and film thickness of each dielectric film are appropriately set such that the dielectric multilayer film filter 330 has a transmission spectrum with a form substantially the same as that of the transmission spectrum shown in FIG. 2A. In particular, the refractive index and film thickness of each dielectric film are appropriately set such that the dielectric multilayer film filter 330 reflects light in the first blocking wavelength band $\lambda_1$ to $\lambda_2$ and light in the second blocking wavelength band $\lambda_5$ to $\lambda_6$.

In the optical filter 300 according to the third embodiment, light from the input end 301 is outputted from an end face of the optical waveguide 310 to the lens 320, and is collimated by the latter. Thus collimated light reaches the dielectric multilayer film filter 330. In the light having reached the dielectric multilayer film filter 330, most of the light components in the first blocking wavelength band $\lambda_1$ to $\lambda_2$ and second blocking wavelength band $\lambda_5$ to $\lambda_6$ are reflected by the dielectric multilayer film filter 330. Since the dielectric multilayer film filter 330 is arranged in a state inclined with respect to the optical axis, the reflected light does not return to the upstream side. On the other hand, most of the light component in the communication wavelength band $\lambda_3$ to $\lambda_4$ is transmitted through the dielectric multilayer film filter 330, and is collected at an end face of the optical waveguide 350 by the lens 340. Thus collected light is guided through the optical waveguide 350, so as to be outputted from the output end 302. Therefore, although the transmission spectrum of the optical filter 300 with respect to the light directed from the input end 301 to the output end 302 is affected by the loss among the individual optical components, its form is substantially the same as that of the transmission spectrum of the dielectric multilayer film filter 330.

The optical filter having a characteristic transmission spectrum for making it possible to eliminate ASE while flattening the gain of EDFA should not be restricted to the above-mentioned embodiments. Namely, while the above-mentioned embodiments relate to optical filters (see FIGS. 3 and 6) including a Bragg grating (short-period grating) and an optical filter (see FIG. 7) including a dielectric multilayer film filter as the optical waveguide type grating device, it may be a long-period grating, for example. Also, other gain equalizers such as etalon filters and taper fibers may be employed. Any of these gain equalizers can realize an optical filter having such a characteristic transmission spectrum that it can eliminate ASE while flattening the gain of EDFA.

When the present invention is employed in an optical communication system together with an optical amplifier, as explained in the foregoing, respective signal powers of a plurality of channels included in the communication wavelength band are amplified by the optical amplifier, and then their gain is equalized (fluctuations among signal channels are reduced). Since the optical filter according to the present invention exhibits a transmissivity of −10 dB or less with respect to light directed from the input end to the output end in each of the first blocking wavelength band having a bandwidth of 20 nm or more located on the shorter wavelength side than the communication wavelength band and the second blocking wavelength band having a bandwidth of 20 nm or more located on the longer wavelength side than the communication wavelength band, in particular, the ASE generated in the optical amplifier is effectively blocked. Namely, the optical filter according to the present invention functions not only as a gain equalizer but also as a noise light blocking filter. As a consequence of such a configuration, the optical amplifier system including the optical filter is realized with a small size at a low cost.

What is claimed is:

1. An optical filter having a transmission spectrum exhibiting:

a ripple of 1 dB or more with respect to light in a communication wavelength band directed from an input end to an output end;

a transmissivity of −10 dB or less with respect to light directed from said input end to said output end in a first blocking wavelength band having a bandwidth of 20 nm or more located on a shorter wavelength side than said communication wavelength band; and a transmissivity of −10 dB or less with respect to light directed from said input end to said output end in a second blocking wavelength band having a bandwidth of 20 nm or more located on a longer wavelength side than said communication wavelength band.

2. An optical filter according to claim 1, comprising:

an optical circulator having a first port for capturing light from said input end, a second port for outputting said light captured by way of said first port, and a third port for outputting said light captured by way of said second port to said output end; and an optical waveguide type grating device, optically connected to said second port of said optical circulator, for reflecting a light component in said communication wavelength band while transmitting therethrough light components in said first and second blocking wavelength bands in light having arrived from said second port.

3. An optical filter according to claim 1, comprising an optical waveguide type grating device for transmitting therethrough a light component in said communication wavelength band while reflecting light components in said first and second blocking wavelength bands in light having arrived from said input end.

4. An optical filter according to claim 3, further comprising an optical isolator, disposed on an optical path between said input end and said optical waveguide type grating device, for transmitting therethrough light directed from said input end to said optical waveguide type grating device while blocking light directed from said optical waveguide type grating device to said input end.

5. An optical filter according to claim 1, comprising a dielectric multilayer film filter for transmitting therethrough a light component in said communication wavelength band while reflecting or absorbing light components in said first and second blocking wavelength bands in light having arrived from said input end.

6. An optical filter according to claim 5, wherein said dielectric multilayer film filter is arranged in a state inclined with respect to a traveling direction of light in said communication wavelength band.

7. An optical amplifier system comprising:

an optical amplifier for amplifying respective signal powers of a plurality of channels included in a communication wavelength band; and the optical filter according to claim 1 for equalizing a gain of said optical amplifier in said communication wavelength band.

8. An optical communication system for transmitting signals of a plurality of channels included in a communication wavelength band, including the optical amplifier system according to claim 7.

* * * * *